United States Patent
Sarkar et al.

(10) Patent No.: US 6,733,674 B2
(45) Date of Patent: *May 11, 2004

(54) METHOD OF DEWATERING SLUDGE USING ENZYMES

(75) Inventors: Jawed Sarkar, Naperville, IL (US); Jitendra Shah, Naperville, IL (US); Manian Ramesh, Barrington Hills, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/347,891

(22) Filed: Jan. 22, 2003

(65) Prior Publication Data

US 2003/0141256 A1 Jul. 31, 2003

Related U.S. Application Data

(63) Continuation-in-part of application No. 10/059,473, filed on Jan. 29, 2002.

(51) Int. Cl.$^7$ .................................................. C02F 11/14
(52) U.S. Cl. ........................ 210/632; 210/721; 210/727; 210/734; 210/737
(58) Field of Search ................. 210/606, 609, 210/631, 632, 721, 725, 727, 728, 734, 758, 759, 737

(56) References Cited

U.S. PATENT DOCUMENTS

| 4,377,486 A | * | 3/1983 | Barrick et al. ............... 210/712 |
| 5,178,762 A | * | 1/1993 | Pokora et al. ............... 210/632 |
| 5,501,770 A | * | 3/1996 | Sarkar et al. ............... 162/100 |
| 5,827,432 A | * | 10/1998 | Huhtamaki et al. ......... 210/705 |

FOREIGN PATENT DOCUMENTS

EP          0 291 665          2/1991

OTHER PUBLICATIONS

"Improved Sludge Dewatering By Enzymatic Treatment". L. Thomas. G. Jungschaffer, B. Sprössler, Wat. Sci. Tech., vol. 28, No. 1, pp. 189–192, 1993.

* cited by examiner

Primary Examiner—Peter A. Hruskoci
(74) Attorney, Agent, or Firm—Michael B. Martin; Thomas M. Breininger

(57) ABSTRACT

A method of dewatering sludge comprising adding an effective amount of one or more cellulolytic enzymes, one or more oxidants and one or more flocculants to the sludge to form a mixture of water and coagulated and flocculated solids and separating the coagulated and flocculated solids from the water.

11 Claims, No Drawings

METHOD OF DEWATERING SLUDGE USING ENZYMES

CROSS REFERENCE TO RELATED APPLICATIONS

This is a continuation in part of Ser. No. 10/059,473, filed Jan. 29, 2002.

TECHNICAL FIELD

This invention concerns the use of cellulolytic enzymes in combination with one or more oxidants and one or more flocculants to aid in dewatering municipal and industrial sludges.

BACKGROUND OF THE INVENTION

The dewatering of municipal and industrial sludges containing suspended organic solids is typically accomplished by mixing the sludge with one or more chemical reagents in order to induce a state of coagulation or flocculation of the solids which are then separated from the water using mechanical devices such as plate and frame filter presses, belt-filter presses, centrifuges, and the like.

For example, in a typical municipal sewage plant, waste water remaining after coarse solids are settled out of the incoming sewage influent is conveyed into a biological clarifying stage, where the dissolved and suspended organic material is decomposed by microorganisms in the presence or absence of air. These processes are referred to as aerobic digestion and anaerobic digestion, respectively.

The organic matter obtained as a result of this decomposition is largely bound in the form of a mass of microorganisms. This mass is precipitated as an activated sludge. The water may be released into waterways or allowed to seep away in sewage irrigation fields, but the activated sludge must be dewatered prior to disposal.

The objective of dewatering processes is to maximize the efficiency of water removal, as decreasing the amount of water retained in the dewatered solids leads decreased transport and disposal costs. Therefore, there is an ongoing need for improved dewatering technologies.

Dewatering of biologically-clarified sludges using a hydrolytic enzyme preparation containing cellulases followed by a high molecular weight cationic flocculant is disclosed in European Patent No. 291 665.

SUMMARY OF THE INVENTION

In its principal aspect, this invention is directed to a method of dewatering sludge comprising
i) adding an effective amount of one or more cellulolytic enzymes, one or more oxidants and one or more flocculants to the sludge to form a mixture of water and coagulated and flocculated solids and
ii) separating the coagulated and flocculated solids from the water.

DETAILED DESCRIPTION OF THE INVENTION

The cellulolytic enzyme preparation used in the practice of this invention are commercially available enzymes obtained from microorganism cultures. The preparations may contain a single cellulolytic enzyme or mixture of cellulolytic enzymes. Additional hydrolytic enzymes including proteases, glycoproteinases, lipases, alpha-amylases, beta-glucanases, hemicellulases, laminarinases, and the like may also be present as impurities in the enzyme preparation.

The cellulolytic enzymes useful in the practice of this invention include one or more cellulases present in the enzyme system that hydrolyzes cellulose to glucose, including endo-1,4-beta-glucanase, exo-1,4-beta-glucanase and 1,4-beta-glucosidase.

In a preferred aspect of this invention, the cellulolytic enzyme is a mixture of endo-1,4-beta-glucanase, exo-1,4-beta-glucanase and 1,4-beta-glucosidase.

In another preferred aspect, the cellulolytic enzyme is endo-1,4-beta-glucanase.

In addition to the cellulolytic enzyme(s), one or more oxidants capable of promoting oxidation of aromatic and non-aromatic moieties present in the sludge is added to enhance dewatering and potentially reduce the required cationic charge of the flocculant utilized.

Oxidants useful in this invention include both chemical oxidants and enzymatic oxidants.

Representative chemical oxidants include potassium permanganate, hydrogen peroxide, sodium peroxide, ammonium persulfate, manganese dioxide, and the like. A preferred chemical oxidant is potassium permanganate.

Suitable oxidative enzymes include peroxidase, laccase, tyrosinase, and the like.

Peroxidases useful in the practice of this invention are selected from the group of enzymes that use organic hydroperoxides or hydrogen peroxide as the oxidant to oxidize phenols to dimers via oxidative coupling. Representative peroxidases include peroxidases extracted from vegetables such soy bean and horseradish, as well as peroxidases from fruits such as apples and bananas and bacterial and fungal peroxidases. Peroxidases are also manufactured from bacteria and fungi.

Laccases, also known as para phenol oxidases, catalyse the oxidation of aromatic compounds where phenolic hydroxy groups are present only at the para position.

The catalytic center (active site) consists of three types of copper with different functions: type 1 (blue copper) catalyses the electron transfer, type 2 activates molecular oxygen and type 3, a copper dimer, is responsible for the oxygen uptake. Oxidation of the substrates by laccase leads to polymerization of the products through oxidative coupling. Products of oxidative coupling reactions result from C—O and C—C coupling of phenolic reactants and also from N—N and C—N coupling of aromatic amines. Laccases are mostly produced by white rot fungi. They may also be produced by plants and bacteria.

Tyrosinases catalyse the oxidation of aromatic compounds where phenolic hydroxy groups are located at the ortho and meta positions. They are commonly known as ortho-phenol oxidases. Similar to laccase, tyrosinases also have copper on its active site.

The effective doses of cellulolytic enzyme(s) and oxidant depend on the properties of the sludge being treated and can be empirically determined by one of skill in the art. In general, the dose of cellulolytic enzyme(s) is from about 20 to about 60 grams, preferably from about 40 to about 60 grams per dry ton of solids.

The effective dose of chemical oxidants is typically about 0.5 to about 5 pounds per ton, preferably about one pound per ton of oven dried sludge.

The effective dose of enzymatic oxidants is typically about 17 to about 50 grams, preferably about 25 to about 50 grams per dry ton solids.

The cellulolytic enzyme and oxidative enzymes are generally available as solutions in water, which can be further diluted. In the process of this invention, aqueous solutions having an enzyme concentration of from about 0.01 to about 100 grams of enzyme protein per liter are typically used.

Hydrogen peroxide is required to activate peroxidase. Dosages of hydrogen peroxide are typically from about 300 to about 1,000 milliliters preferably from about 500 to about 1,000 milliliters (based on a 30% aqueous hydrogen peroxide solution) per dry ton of solids.

For laccase, a mediator such as 2,2'-azino-bis(3-ethylbenzothiazine-6-sulfonic acid), commonly known as ABTS, is preferably used to obtain a satisfactory reaction rate.

In a typical application, the sludge to be dewatered is warmed to about 30° C. to about 60° C., preferably about 30° C. to about 40° C. with mixing. An aqueous solution of the celluloytic enzymes, prepared as described above is then added. After a period of about 10 minutes to several days, an aqueous solution of the chemical oxidant or an aqueous solution of the oxidative enzymes and any required activators and mediators are added together to the mixed sludge. Mixing and heating are then continued for about 2 hours to several days, after which time the sludge is cooled to ambient temperature and the flocculants and any coagulants are added. The sludge is mechanically dewatered, for example by devices such as plate and frame filter presses, belt-filter presses, centrifuges, and the like.

Suitable flocculants for use in this invention generally have molecular weights in excess of 1,000,000 and often 20,000,000. The polymeric flocculant is typically prepared by vinyl addition polymerization of one or more cationic monomers, by copolymerization of one or more cationic monomers with one or more nonionic monomers, or by polymerization of the cationic monomers with one or more anionic monomers and optionally one or more nonionic monomers to produce an amphoteric polymer.

While the polymer may be formed as a cationic polymer, it is also possible to react certain non-ionic vinyl addition polymers to produce cationically charged polymers. Polymers of this type include those prepared through the reaction of polyacrylamide with dimethylamine and formaldehyde to produce a Mannich derivative.

The flocculant may be used in the solid form, as an aqueous solution, as a water-in-oil emulsion, or as dispersion in water. Representative cationic polymers include copolymers and terpolymers of (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate, methyl chloride or benzyl chloride. A preferred flocculant dimethylaminoethylacrylate methyl chloride quaternary salt/acrylamide copolymer.

The dose of flocculant depends on the properties of the sludge being treated and can be empirically determined by one of skill in the art. In general, the flocculant polymer dose is from about 100 ppm to about 600 ppm, preferably from about 200 to about 600 ppm, based on polymer solids, per dry ton solids.

In another preferred aspect, one or more coagulants are added to the sludge after the enzyme treatment.

Water soluble coagulants are well known, and commercially available. Many water soluble coagulants are formed by condensation polymerization. Examples of polymers of this type include epichlorohydrin-dimethylamine, and epichlorohydrin-dimethylamine-ammonia polymers.

Additional coagulants include polymers of ethylene dichloride and ammonia, or ethylene dichloride and dimethylamine, with or without the addition of ammonia, condensation polymers of multifunctional amines such as diethylenetriamine, tetraethylenepentamine, hexamethylenediamine and the like with ethylenedichloride and polymers made by condensation reactions such as melamine formaldehyde resins.

Additional coagulants include cationically charged vinyl addition polymers such as polymers and copolymers of diallyldimethylammonium chloride, dimethylaminoethylmethacrylate, dimethylaminomethylmethacrylate methyl chloride quaternary salt, methacrylamidopropyltrimethylammonium chloride, (methacryloxyloxyethyl)trimethyl ammonium chloride; diallylmethyl(beta-propionamido)ammonium chloride; (beta-methacryloxyloxyethyl)trimethyl-ammonium methylsulfate; quaternized polyvinyllactam; dimethylaminoethylacrylate and its quaternary ammonium salts; and acrylamide or methacrylamide which has been reacted to produce the Mannich or quaternary Mannich derivative. The molecular weights of these cationic polymers, both vinyl addition and condensation, range from as low as several hundred to as high as one million. Preferably, the molecular weight range should be from about 20,000 to about 1,000,000.

In a preferred aspect of this invention, the sludge is selected from the group consisting of municipal and industrial sludges.

In another preferred aspect, the sludge is a municipal sludge.

In another preferred aspect, the sludge is an activated sludge.

The foregoing may be better understood by reference to the following examples, which are presented for purposes of illustration and are not intended to limit the scope of the invention.

EXAMPLE 1

Treatment of Sludge with Enzymes

Fresh, anaerobically digested sewage sludge samples (1300 g in the form of a paste or slurry, containing about 26 g of solids) are obtained from midwestern suburban municipal treatment plants. The samples are heated at 40° C. When the temperature of the samples reaches 40° C., a cellulolytic enzyme having only endoglucanase activity (NS51008, 10% aqueous solution, available from Novozymes, North America, Inc., Franklinton, N.C.) is added. The dose of cellulolytic enzyme solution is about 0.17 liters for the treatment of sludge having about one ton solids (oven dried). The sludge with enzyme is well mixed for 10 to 120 minutes at 250 rpm and at 40° C. During the mixing, soy bean peroxidase (available from Biocatalytic, Inc, Pasadena, Calif.) is added. The dose of peroxidase is 0.5 mg of enzyme to treat sludge containing 26 grams solids (oven dried). Hydrogen peroxide (10 microliter of 30% aqueous solution) is also added to the sludge to activate the peroxidase. The enzyme treatment of the sludge is continued for about two hours.

EXAMPLE 2

Drainage Test

To perform the drainage test, 200 ml of the enzyme-treated sludge sample of Example 1 is placed in a 500 ml cylinder. Twenty mL of a 0.5% aqueous polymer flocculent solution is added to the sludge and mixed by inverting the cylinder.

The number of inversions is dependent upon the particular sludge utilized. Chemical and biological sludges are very fragile and do not require very many inversions before the floc breaks up and the sludge becomes liquid again. How thick the sludge is to begin with will determine the number of inversions. Sludges greater than 8% TSS may need to be diluted 50:50 with water in order to achieve good distribution of the polymer with the sludge.

Once a good floc is obtained and the inside of the cylinder is clean (indicating sufficient mixing with no excess of polymer), the sample is poured through a belt filter press cloth and the amount of water drained (in mL) in 20 seconds is utilized as a measure of dewatering effectiveness. Flocculated sludge is then poured through a belt filter press cloth and the amount of water (in mL) drained in 10 seconds is utilized as a measure of the polymer performance. The results are shown in Tables 1–3.

TABLE 1

Drainage of an Anaerobic Municipal Sludge with a High Charge Flocculant Polymer, with Celluloytic Enzyme and with Celluloytic Enzyme and Peroxidase

| Polymer Dose[1] | Polymer Alone | Polymer + Cellulolytic Enzyme | Polymer + Cellulolytic Enzyme + Peroxidase |
|---|---|---|---|
| 200 | 14 | 12 | 16 |
| 250 | 18.6 | 14.2 | 18.6 |
| 300 | 23.2 | 31.5 | 33.3 |
| 375 | 38.9 | 50.3 | 58.5 |
| 450 | 63.2 | 59 | 83.6 |
| 500 | | 87.8 | 92 |
| 550 | | 96.6 | 94.6 |

[1]50 mole percent dimethylaminoethylacrylate methyl chloride quaternary salt/acrylamide copolymer, available from Ondeo Nalco Company, Naperville, IL.

As shown in Table 1, dewatering efficiency is increased by treatment with polymer and enzymes relative to polymer treatment alone. The data further show that use of cellulase and peroxidase results in a further increase in drainage over treatment with cellulase alone. Treatment of a different sample from the same facility shows similar results.

TABLE 2

Drainage of an Anaerobic Municipal Sludge with a Low Charge Flocculant Polymer, with Celluloytic Enzyme and with Celluloytic Enzyme and Peroxidase

| Polymer Dose[1] | Polymer Alone | Polymer + Cellulolytic Enzyme | Polymer + Cellulolytic Enzyme + Peroxidase |
|---|---|---|---|
| 200 | 7.7 | 14 | 10 |
| 250 | 12.2 | 16 | 12 |
| 300 | 15 | 16.4 | 15.4 |
| 375 | 18.3 | 22.6 | 25.7 |
| 450 | 30 | 38 | 39 |
| 500 | 37.6 | 43.5 | 44.8 |
| 550 | 50 | 54 | 60 |
| 625 | 69.2 | 69.9 | 84.4 |
| 700 | 81.2 | 78 | 90.3 |
| 750 | | 99.5 | 98.4 |

[1]30 mole percent dimethylaminoethylacrylate methyl chloride quaternary salt/acrylamide copolymer, available from Ondeo Nalco Company, Naperville, IL.

As shown in Table 2, the drainage is higher when sludge is treated with flocculant and a combination of cellulase and peroxidase compared with only flocculant and cellulase. Similar results are obtained when a different batch of sludge from the same facility is tested.

TABLE 3

Drainage of an Anaerobic Municipal Sludge with a Combination of Low Charge and High Charge Flocculant Polymers, with Celluloytic Enzyme and with Celluloytic Enzyme and Peroxidase

| Polymer Dose | Polymer A[1] | Polymer B[2] | Polymer A + Cellulase + Peroxidase | Polymer B + Cellulase + Peroxidase |
|---|---|---|---|---|
| 200 | 14 | 7.7 | 16 | 10 |
| 250 | 18.5 | 12.2 | 18.6 | 12 |
| 300 | 23.2 | 15 | 33.3 | 15.4 |
| 375 | 38.9 | 18.3 | 58.5 | 25.7 |
| 450 | 63.2 | 30 | 83.6 | 39 |
| 500 | | 37.6 | 92 | 44.8 |
| 550 | | 50 | 94.6 | 60 |
| 625 | | 69.2 | | 84.4 |
| 700 | | 81.2 | | 90.3 |
| 750 | | | | 98.4 |

[1]50 mole percent dimethylaminoethylacrylate methyl chloride quaternary salt/acrylamide copolymer, available from Ondeo Nalco Company, Naperville, IL.
[2]30 mole percent dimethylaminoethylacrylate methyl chloride quaternary salt/acrylamide copolymer, available from Ondeo Nalco Company, Naperville, IL.

As shown in Table 3, Polymer A (50 mole percent) alone or in combinations with enzymes better than Polymer B (30 mole percent). Similar results are obtained when the is repeated using a different batch of sludge from the same facility.

EXAMPLE 3

Treatment of Sludge with Celluloytic Enzymes and a Chemical Oxidant

Fresh, anaerobically digested sewage sludge samples (1300 g in the form of a paste or slurry, containing about 26 g of solids) are obtained from midwestern suburban municipal treatment plants. The samples are heated to 40° C. When the temperature of the samples reaches 40° C., a cellulolytic enzymes having only endoglucanase activity (NS51008, 10% aqueous solution, available from Novozymes, North America, Inc., Franklinton, N.C.) is added. The dose of cellulolytic enzyme about 0.17 liters for the treatment of sludge having about one ton solids (oven dried). The sludge with enzyme is mixed at 100 rpm at 40° C. for 12 hours. The enzyme treated sludge is cooled to ambient temperature (about 20° C.). An aqueous solution of $KMnO_4$ (14 mg $KMnO_4$ solids dissolved in 10 ml water) is added and the sludge is briefly mixed. The dose of $KMnO_4$ is approximately 1.0 Lb./t of dry sludge). The drainage test is then performed using various dosages of a 30 mole % cationic flocculant (Polymer B) as described above. The drainage results are shown in Table 4.

TABLE 4

Drainage of an Anaerobic Municipal Sludge with a Combination of a Flocculant Polymer, Celluloytic Enzyme and Potassium Permanganate

| Polymer Dose (ppm) | Polymer B[1] | Polymer B + Cellulase | Polymer B + Cellullase + $KmnO_4$ |
|---|---|---|---|
| 375 | 37.2 | 75.8 | 72.1 |
| 450 | 57.7 | 90.2 | 90.6 |
| 500 | 73.3 | 99 | 97.6 |
| 575 | 97.7 | 105.9 | 114.7 |

[1]30 mole percent dimethylaminoethylacrylate methyl chloride quaternary salt/acrylamide copolymer, available from Ondeo Nalco Company, Naperville, IL.

As shown in Table 4, comparable drainage is obtained when a chemical oxidant is substituted for an enzymatic oxidant.

In sludge dewatering applications, synthetic polymers are typically used. Enzymes are proteins and are known to be environmentally friendly. The use of enzymes in combination with synthetic polymers in dewatering applications as described herein can help reduce the amount of synthetic polymers used while achieving comparable or improved performance compared to use of polymer alone. This invention discloses the advantages of enzymes with polymers for sludge dewatering and dry solids.

Various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method of dewatering sludge comprising sequentially
   i) adding an effective amount of a cellulolytic enzyme preparation having only endoglucanase activity to the sludge;
   ii) adding an effective amount of one or enzymatic or chemical oxidants to the sludge;
   iii) adding an effective amount of one or more flocculants to the sludge to form a mixture of water and coagulated and flocculated solids; and
   iv) separating the coagulated and flocculated solids from the water, wherein the enzymatic oxidants are selected from the group consisting of peroxidase, laccase and tyrosinase, the chemical oxidants are selected from the group consisting of potassium permanganate, hydrogen peroxide, sodium peroxide, ammonium persulfate and manganese dioxide and the flocculants are selected from the group consisting of copolymers and terpolymers of (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate, methyl chloride of benzyl chloride and having a molecular weight in excess of one million.

2. The method of claim 1 wherein the sludge is selected from the group consisting of municipal and industrial sludges.

3. The method of claim 1 wherein the sludge is a municipal sludge.

4. The method of claim 1 wherein the sludge is an activated sludge.

5. The method of claim 1 wherein the chemical oxidant is potassium permanganate.

6. The method of claim 1 wherein the polymeric flocculant is dimethylaminoethylacrylate methyl chloride quaternary salt/acrylamide copolymer.

7. The method of claim 1 further comprising adding one or more coagulants to the sludge.

8. The method of claim 7 wherein the coagulant has a molecular weight of about 20,000 to about 1 million.

9. The method of claim 1 wherein the enzyme preparation having only endoglucanase activity comprises endo-1,4-beta-glucanase.

10. The method of claim 1 wherein steps i) and ii) are conducted at a temperature of about 30° C. to about 60° C.

11. The method of claim 1 wherein steps i) and ii) are conducted at a temperature of about 30° C. to about 40° C.

* * * * *